United States Patent [19]

Miles et al.

[11] 3,802,018
[45] Apr. 9, 1974

[54] SUSPENSION FOR MOBILE RAMP STRUCTURE

[75] Inventors: Ray P. Miles, Macedonia; Andrew E. Szucs, Fairview Park, both of Ohio

[73] Assignee: The Copperloy Corporation, Cleveland, Ohio

[22] Filed: May 22, 1972

[21] Appl. No.: 255,209

Related U.S. Application Data

[63] Continuation-in-part of Ser. No. 99,367, Dec. 18, 1970, which is a continuation-in-part of Ser. No. 763,175, Sept. 27, 1968, Pat. No. 3,548,433.

[52] U.S. Cl. .................................................. 14/72
[51] Int. Cl. ............................................ E01d 15/12
[58] Field of Search ............ 14/72, 1; 404/122, 125, 404/126, 132

[56] References Cited
UNITED STATES PATENTS

| 3,010,128 | 11/1961 | Gillois | 14/1 |
| 2,978,967 | 4/1961 | MacDonald | 404/125 |
| 2,449,829 | 9/1948 | Agren | 14/72 |
| 3,233,767 | 2/1966 | Goodacre | 14/72 X |
| 2,670,484 | 3/1954 | Bintliff | 14/72 |
| 3,639,935 | 2/1972 | Kumpolt | 14/72 |
| 2,880,431 | 4/1959 | Noland | 14/72 |
| 3,283,841 | 11/1966 | Davis | 404/122 X |

Primary Examiner—Nile C. Byers, Jr.
Attorney, Agent, or Firm—Millen, Raptes & White

[57] ABSTRACT

The invention relates to a vehicle such as a mobile ramp provided with a novel spring suspension and vertical adjusting means which are adapted to provide a spring action while the vehicle is being towed from place to place. When the ramp is in a work position, the spring suspension means can be disengaged to permit vertical adjustment of the ramp.

3 Claims, 10 Drawing Figures 3,802,018

SUSPENSION FOR MOBILE RAMP STRUCTURE

This invention is a continuation-in-part of copending U.S. Pat. application Ser. No. 99,367 filed Dec. 18, 1970 which was a continuation-in-part of copending U.S. Pat. application Ser. No. 763,175 filed Sept. 27, 1968, now U. S. Pat. No. 3,548,433.

This invention relates to towable vehicles and particularly to mobile yard ramps of the type adapted to facilitate loading and unloading of carriers, such as railroad freight cars and the like. The yard ramp of the invention also exhibits utility in other types of carriers such as airplanes and large trucks. In general, the invention facilitates the loading and unloading of such vehicles and is further characterized by its ability to be towed along highways. In general, the invention relates to mobile yard ramps and also to a dirigible ramp having its own power supply and a set of controls which enables a single operator to precisely position the ramp at a desired locale in an unloading or in a loading area with respect to either a shipping or a storing container.

In general, a mobile yard ramp fabricated according to the practice of this invention includes a pair of wheels positioned approximately midway of the length of the ramp, and in the case of a motorized ramp, the wheels are driven and are associated with differential drive means and a prime mover. A third wheel is provided longitudinally of the ramp and imparts stability to the ramp. When exact positioning of the ramp has been accomplished, the third wheel is withdrawn and that end of the ramp nearest the wheel comes into engagement with the ground.

In particular, this invention relates to a novel spring suspension and vertical adjusting system which is adapted to provide a spring action to a vehicle or ramp while it is being towed from place to place. Yard ramps can be fabricated having lengths as long as thirty feet or more. The towing of the ramps is facilitated by the provision of this invention along with the added ability to vertically adjust the ramp at the work area.

The description of the invention hereinafter is with reference to a motorized yard ramp wherein the ramp is provided with power means, e.g., a motor, for self-locomotion and wherein it is dirigible. The power from the motor is also used to operate a hydraulic system and the vertical adjusting means which enables the pair of wheels to be adjustable vertically with respect to the ramp to effect vertical positioning of the ramp. The spring suspension system is adapted to be disengaged at the time the vertical adjustment is made.

Alternatively, the spring-suspension system and vertical adjusting means can be used with a vehicle or mobile yard ramp having no power means for self-locomotion. Thus, the vertical adjusting means can be operated with a hydraulic system associated with its own power means or the adjusting means can be operated with a manually operated hydraulic pump.

The purpose of the vertical adjusting means is to provide a leveling range to fit loading situations. In the work position, the yard ramp is inclined and one end rests on the ground while the other end is elevated and is fitted to the freight car, truck, dock entrance, and the like. The vertical adjustment permits leveling of the elevated ramp end with the deck or floor of the carrier or dock.

The ramp of this invention may further be provided with a safety surface grating to increase the friction between the ramp and any mobile carrier, such as a pallet truck used for loading or unloading purposes. A variety of advantages will immediately become apparent to those skilled in this art from a consideration of the following specific embodiment of the invention.

Figure 9:
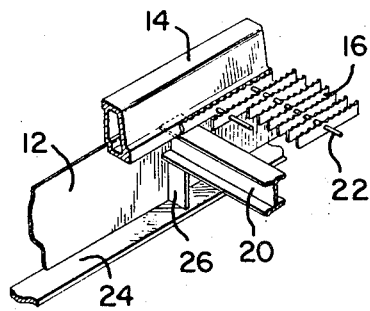
FIG. 9 is a fragmentary perspective view of the elements involved in the basic construction of the ramp.

Referring now to the drawings, a yard ramp having power locomotion means is defined by a generally rectangular and elongated ramp having sheet metal surface end portions 10. The sides of the ramp are denoted by the numeral 12 and upper rim portions 14 extend generally throughout the length of the ramp. Numeral 16 denotes a grating strip having serrated edges, the strips mounted together to define a main surface portion 18 of the ramp having extremely high friction qualities. This enables high traction between the ramp and any loading or unloading vehicle travelling thereon. The grating members 16 may be held in parallel relationship by transversely extending rod members 22, as shown at FIG. 9. A series of crossbeam members 20 are welded to an assembly of longitudinal side web elements 12 and upper elements 14 at spaced longitudinal portions. The lower portions of the side elements 12 are secured to longitudinal runner elements 24 and to vertical stiffener elements 26. The elements 26 are also secured to the underside of transverse beam members 20 and to runner elements 24.

The numeral 30 denotes either one of two wheels as in the form of conventional tires which are mounted on the ends of a single axle 32. The numeral 34 denotes in general a prime mover or power source, such as a gasoline engine, and is mounted generally midway of one of the transverse beam elements 20. The numeral 36 denotes a hydraulic pump suitably coupled, as by means of a belt and pulley, to the power output of the power means 34.

A fluid motor 46 has one end pivoted to a reinforced underside portion of the ramp designated as noted by the numeral 48, while the other end of the motor 46 is pivotally coupled to an intermediate portion of an elongated arm or plate 50. It will be understood that there are two such hydraulic motors, 46, with each being fed from the pump 36.

Each arm 50 is pivoted at one of its ends to a portion of the axle 32 and is pivoted at its other end to pivot point 52. The latter pivots are carried by mounting bracket 54 secured to a reinforced portion of the ramp rearwardly of the axle. Shock absorbing devices 56 each have one end pivotally secured to axle 32 and their other ends are releasably secured, as by pins 57, to the underside of the ramp forwardly of the axle.

Figure 10:
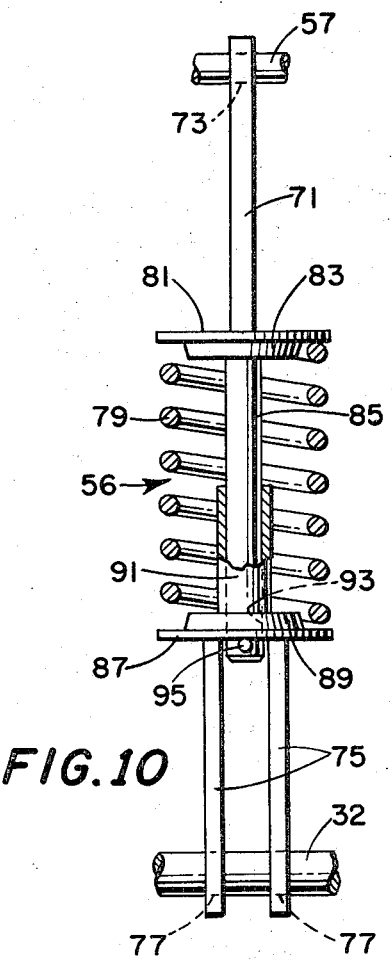
FIG. 10 is a side view of the shock-absorbing device shown in FIG. 3 disclosing details thereof.

As shown in FIG. 10, the shock absorbing device 56 comprises an upper member 71 with hole 73, a lower bifurcated member 75 with holes 77, and a spring (partially shown) 79. Member 71 comprises integral flange 81, spring retainer 83 and rod 85. Member 75 comprises integral flange 87, spring retainer 89, and tubular member 91. Flange 87 has hole 93 at its center which is concentric with tubular member 91. The spring 79 is retained between flanges 81 and 87 under a predetermined compression load. Rod 85 slides within tubular member 91 and through hole 93. A pin 95 through a hole in the end of the rod bearing against flange 87 retains the load on the spring. Hole 73 of member 71 is pivotally connected to the underside of the ramp and is releasably secured by pin 57. Holes 77 of member 75 are pivotally secured to the axle 32.

Figure 3:
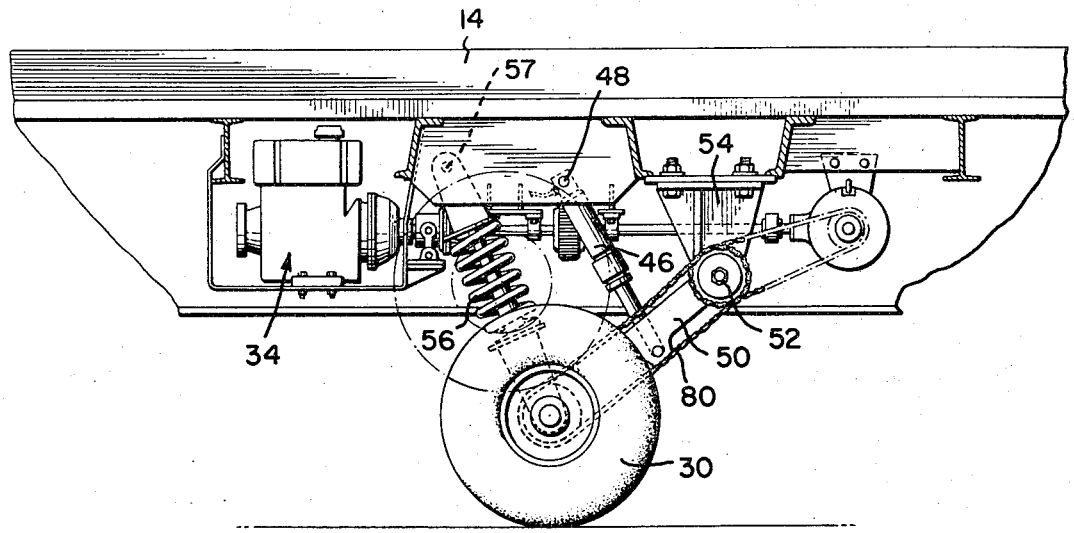
FIG. 3 is a side elevational view of the complete drive assembly and hydraulic type cylinders for raising and lowering the ramp, and may be considered a partial view of FIG. 2.

The numeral 60 denotes a portion of the output shaft of the power means 34 and is coupled to gear 62. The numeral 64 denotes generally reversing gearing between the power gear 62 and the input power shaft 66 to a differential 68. Output shafts 70 and 72 are secured to the differential 68 and carry at their outer ends sprocket wheels 74 and 76. Sprocket chains from these elements are connected to sprocket wheels mounted on pivot 52. These latter wheels, in turn, each carry a connected sprocket wheel and chain, the latter such as indicated by the numeral 80 of FIG. 3. Sprocket wheels 82 are secured to and rotate the wheels 30. It will be apparent then that power from power output shaft 60 and output gear 62 is through the gearing 64 to shaft 66 and then to differential 68. The differential 68 is of conventional construction and, as known to workers in this art, will enable one of the wheels 30 to rotate at a different rate than the other when the entire device is being turned about an axis generally at right angles to the ramp. Power from sprocket wheels 74 and 76 finds its way through intermediate sets of sprocket wheels and chains to the wheels 30.

Figure 7:
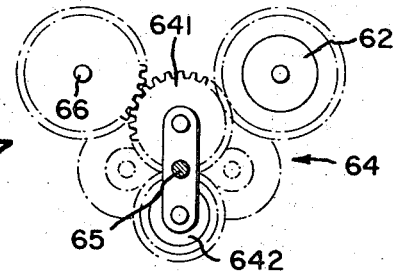
FIG. 7 is a side view of drive gears for reversing direction.

As shown in detail at FIG. 7 of the drawings, the gearing 64 defines a reverse direction arrangement wherein the two main gears are coupled either by a single gear 641 (in the illustrated position) to give a first rotary direction to shaft 66, or coupled by the two gears 641 and 642 (as shown in the dashed position) to give a second or opposite direction of rotation to shaft 66. Rotation of shaft 65 will effect the described change in position of gears 641 and 642, with the shaft 65 being controlled by rotating hand lever 86 positioned exteriorally of the ramp for easy access. It will be understood that before such a direction change may be effected, clutch mechanism 88 must be disengaged by a rotating hand lever 90, also positioned on the exterior of the ramp near the lever 86. The drive mechanism of FIG. 7 may be changed to a hydraulic instead of a mechanical drive.

Figure 1:
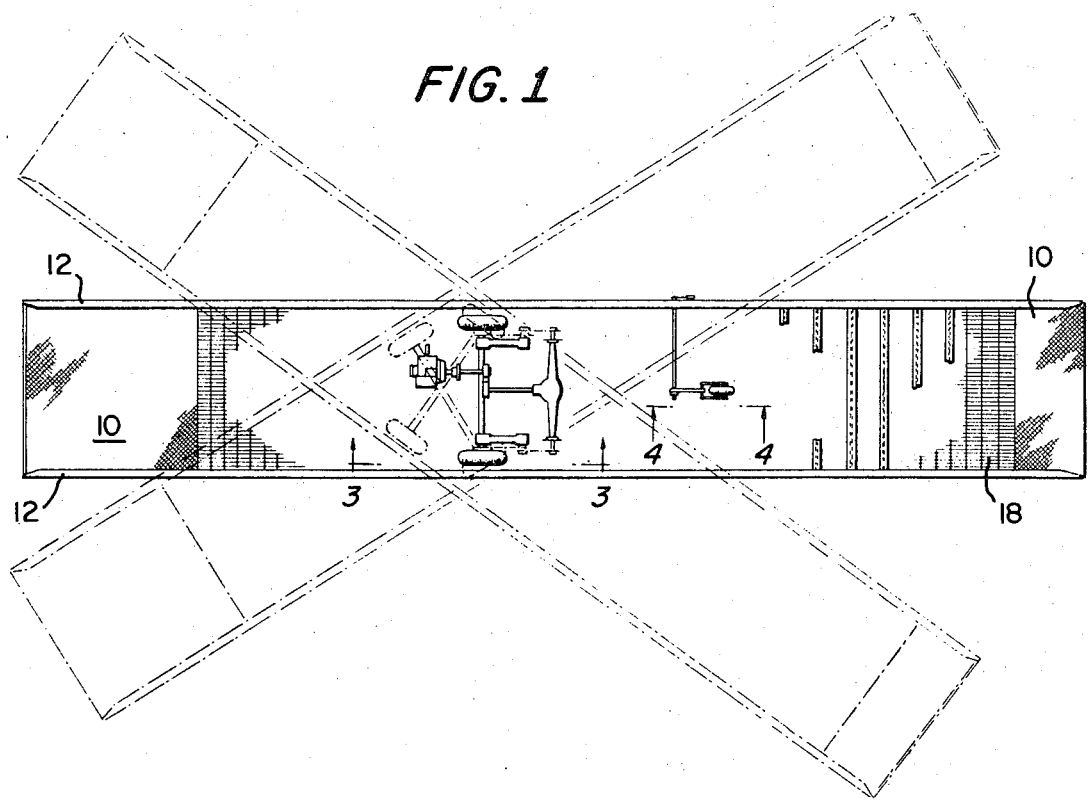
FIG. 1 is a plan view of the complete ramp and illustrates, by the phantom lines, the maneuverability of the ramp.
Figure 2:
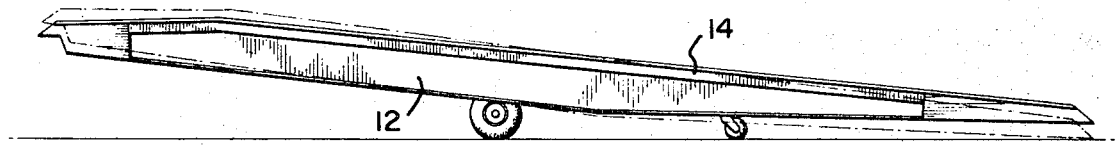
FIG. 2 is a side elevational view of the complete ramp with its pair of wheels and trailing third wheel, all in the lowermost position for ease in transporting the ramp, as by towing.
Figure 4:
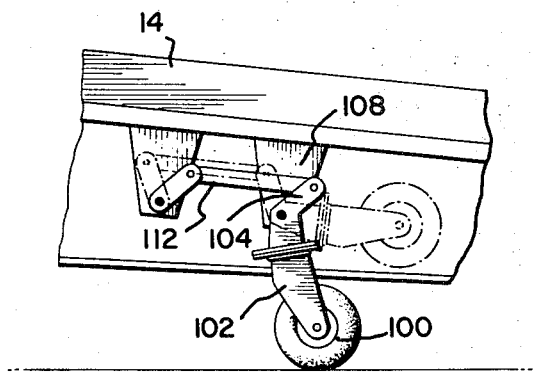
FIG. 4 illustrates the trailing or third wheel and its actuating linkage in its lower position.
Figure 6:
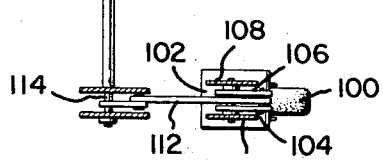
FIG. 6 is a plan view of the trailing or third wheel and linkage.

Turning now to FIGS. 4 and 6 of the drawings in particular, the numeral 100 denotes a third wheel positioned an appreciable distance from the wheel 30 and suitably mounted on the underside of the ramp and preferably midway thereof. The wheel is of the self-aligning or caster type, its mounting including a nearly vertical pivot to allow for swivel motion and direction changes. A forked bracket 102 is secured to a pair of upstanding ear portions 104 and 106, with the latter being pivoted to downwardly extending support plates 108 and 110 from the underside of the ramp. A bar lever 112 extends from a pivot pin coupling the ends of the ears 104 and 106 to the indicated linkage defined by an elongated rod 114, suitably supported and positioned along the ramp, and an arm extending from one end thereof and a handle 116 at the other end. The handle 116 is manually operable and, as the reader will appreciate by consideration of FIGS. 4 and 6 of the drawings, the rotation of this handle will cause the third wheel 100 to assume either the solid illustrated position of FIG. 4 or the dashed position of FIG. 4 or the dashed position thereof. In the latter position, the right end of the ramp (FIG. 2) will touch the ground.

Figure 8:
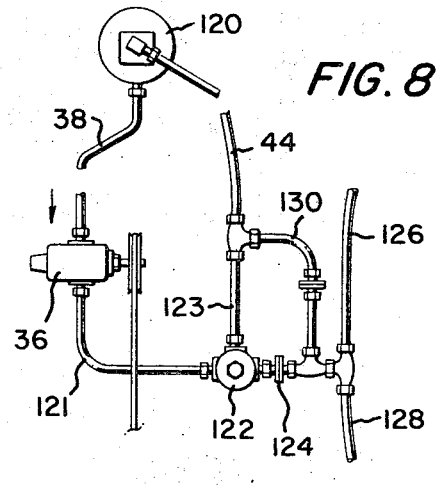
FIG. 8 is a plan view of the hydraulic system for controlling a hydraulic power cylinder which raises and lowers the ramp for adjustment to accommodate varying heights of carriers.

Referring now to FIG. 8 of the drawings, the description of the hydraulic circuitry which effects the raising and the lowering of wheels 30 will now be offered. Firstly, the releasable pin 57 is removed and devices 56 are moved to an inoperative position. The numeral 120 denotes a fluid reservoir positioned in the indicated hydraulic circuit. A line 121 leads from the output of the pump 36 to the common input port of a three-way valve 122. It will here be observed that the valve 122 is accessible to the outside of the ramp, as by means of an aperture in one of the sides, to enable the hand of an operator to actuate the valve for a purpose which will now be explained. One line 123 of the valve 122 leads directly through a tee to line 44 and thence back through the reservoir 120. This is the flow of the hydraulic fluid in the non-moving or lowermost position of the wheels 30. Thus, with the prime mover 34 running, there is merely a circulation of the hydraulic fluid between the pump 36 and the reservoir 120. When it is desired to raise the left (FIG. 2) end of ramp 30 by actuating the hydraulic motors 46, the valve 122 is turned so that no fluid now flows through line 123, rather fluid flows through check valve 124 and thence divides. A portion of this divided flow passes through line 130 and thence through line 44 back to the reservoir 120. The other divided portion leads into lines 126 and 128, these feeding directly into the hydraulic motors 46. Thus, when the wheels are being moved relative to the ramp, there is some flow from the pump back into the reservoir.

From the above description, it is apparent that the shock absorbing devices 56 are secured in place by pins 57 when the ramp is being towed or transported. Spring 79, preloaded to a suitable compression, provides the desired spring action during towing, etc. It is to be noted that the fluid motor 46 will coact with the shock absorbing devices 56 while the ramp is being towed. This is accomplished in the motorized yard ramp by turning valve 122 so that no fluid passes through the check valve 124 causing circulation of fluid from the reservoir 120, through pump 36, line 121, valve 122, line 123, line 44 and back to the reservoir. Fluid in the fluid motor 46 will oscillate back and forth, with vibrations, from cylinders of motors 46 and the smaller diameters of lines 126 and 128, line 130, and the circulation of the fluid above mentioned.

In the case of a non-motorized ramp, since the hydraulic pump is not in operation during towing and the fluid motors are in an open position, the fluid will oscillate between the cylinders of the fluid motors, the smaller diameter lines leading to the hydraulic motor, and the hydraulic reservoir.

In both of the above cases during towing of the ramp, vibrations on arm 50 cause fluid to flow back and forth between the fluid motor cylinders and the lines leading to the reservoir. As the fluid flows from the cylinders it is restricted in its flow as it passes through the lines leading to the reservoir. In this manner, the back and forth flow of the fluid has a dampening effect on the shock absorbing devices. Thus, the fluid motors aid in the shock absorbing properties of the suspension system.

When the ramp is to be positioned for use in a work area, the devices 56 are made inoperative by suitable actuation of fluid motors 46 until the pressure on pin 57 is released. The pins 57 are then easily removed and the devices 56 are moved on the axle pivot ends to a non-operative position. In that position of the devices 56, the ramp is free to be lowered or raised by suitable actuation of fluid motors 46 as heretofore fully described.

It is within the concept of this invention that the fluid motors 46 can be optionally actuated by hydraulic handpumps which can be suitably connected thereto. Thus, the power means 34 and the associated gearing and hydraulic circuitry are not required when a motorized yard ramp is not desired.

Figure 5:
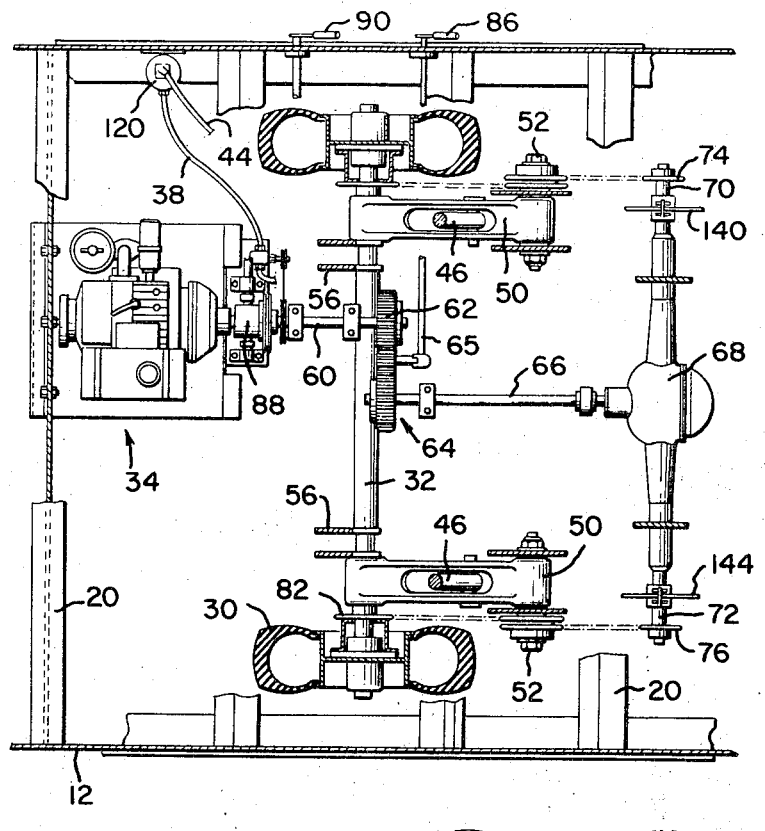
FIG. 5 is a plan view of the complete internal drive assembly, including the prime mover for making the device completely self-mobile.

Steering of the motorized yard ramp is effected by two disc brake elements 140 and 144, secured, as indicated, to the output shafts of differential 68. In practice, steering is effected by applying a friction brake (not illustrated) to one or the other of the discs. This is done by means of conventional brake shoe elements actuated by levers, such as lever 90, as shown at FIG. 5.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A mobile ramp capable of being towed comprising in combination;
   a. an elongated ambulatory structure having a substantially planar and rectangular top surface,
   b. a pair of vertically adjustable first wheel means disposed on axle means at a substantially intermediate longitudinal portion of said elongated structure,
   c. self aligning second wheel means disposed substantially intermediate said first wheel means and the trailing end of said ramp,
   d. releasable shock absorbing means including preloaded spring means pivotally connected to said axle means and pivotally connected to the underside of said structure forwardly of said axle means, to facilitate transport of said ramp over towed distances,
   e. arm means pivotally connected at one end to said axle means and means pivotally connecting the opposite end of said arm means to the underside of said structure rearwardly of said axle means,
   f. fluid motor means pivotally connected at one end to an intermediate point of said arm means and the opposite end of said motor means being pivotally connected to the underside of said structure intermediate the underside connections of said shock absorbing means and said arm means,
   g. fluid reservoir means communicating with said fluid motor means, whereby said arm means, said shock absorbing means, and said fluid motor means in the open position with said reservoir means, coact together to provide suspension and shock absorbing means for said ramp when it is being towed, and whereby, when said shock absorbing means is released from said combination, said arm means and said fluid motor means provide suspension for said ramp along with means for vertically adjusting the forward end of said ramp by either raising or lowering the intermediate portion of said ramp.

2. The mobile ramp of claim 1 wherein an end of said shock absorbing means is releasably mounted on the underside of said ramp.

3. The suspension and adjusting means of claim 1 wherein said fluid motor means comprises manually operable hand pump means.

* * * * *